(12) United States Patent
Gupta et al.

(10) Patent No.: US 7,251,630 B1
(45) Date of Patent: Jul. 31, 2007

(54) DISTRIBUTED BID PROCESSING METHOD FOR OPEN-CRY AND DESCENDING PRICE AUCTIONS

(75) Inventors: Manish Gupta, New Delhi (IN); Sandeep Juneja, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/505,509

(22) Filed: Feb. 17, 2000

(51) Int. Cl.
*G06Q 40/00* (2006.01)

(52) U.S. Cl. .......................................... 705/37; 705/36
(58) Field of Classification Search .................. 705/37, 705/36
See application file for complete search history.

(56) References Cited

U.S. PATENT DOCUMENTS

| | | | |
|---|---|---|---|
| 5,905,974 A | * | 5/1999 | Fraser et al. ................... 705/37 |
| 6,134,589 A | * | 10/2000 | Hultgren ...................... 709/227 |
| 6,449,601 B1 | * | 9/2002 | Friedland et al. ............. 705/37 |

OTHER PUBLICATIONS

M. Kumar, et al., "Internet Auctions", http//www.mkumar@watosn.im. com 1998.

H.G. Lee, et al., "Impact of the Electronic Marketplace on Transaction Cost and Market Structure", International Journal of Electronic Commerce, vol. 1, No. 1, pp. 127-149, 1996.

E. Turban, "Auctions and Bidding on the Internet: An Assessment", International Journal of Electronic Markets, vol. 7, No. 4, date unknown.

M. Kumar, et al., "Business Negotiations on the Internet", Geneva, Switzerland, Jul. 21-23, 1998.

W. Vickrey, "Conterspeculation, Auctions, and Competitive Sealed Tenders", The Journal of Finance, Mar. 1961, pp. 8-37.

* cited by examiner

*Primary Examiner*—James Trammell
*Assistant Examiner*—Daniel Felten
(74) *Attorney, Agent, or Firm*—Whitham, Curtis, Christofferson & Cook, PC; Ed Mizamoto (57) ABSTRACT

A distributed bid processing method uses a number of computers to process bids for a given open-cry auction or descending price auction in a distributed manner. The computers examine a set of bids and quickly filter out the losing bids. This helps in achieving faster processing and reduces response times. Two methods are developed for open-cry auctions and one for descending price auction. The methods apply to a distributed web server where some servers may be placed far apart geographically.

3 Claims, 7 Drawing Sheets

DISTRIBUTED BID PROCESSING METHOD FOR OPEN-CRY AND DESCENDING PRICE AUCTIONS

BACKGROUND OF THE INVENTION

1. Field of the Invention

The present invention generally relates to electronic auctions and, more particularly, to a distributed bid processing method for open-cry and descending price auctions.

2. Background Description

Most business activity on the Internet is limited to publicizing the business opportunity and conducting catalog based sales, but it will rapidly expand to include the negotiations conducted to settle the price of the goods or commodities being traded. These negotiations are currently conducted by human intermediaries through various forms of auctions, bidding systems for awarding contracts, and brokerages. The role of the intermediaries can now be performed by Internet trading applications at a fraction of the cost. Trading on the Internet allows a business to reach a larger number of potential customers and suppliers in a shorter time and a lower cost than possible by other modes of communication, and to settle business transactions with lower cost overhead in a shorter time. Hence the rapid emergence of Internet based trading applications. See Manoj Kumar and Stuart I. Feldman, "Internet Auctions", published on IBM's Web site at /iac/papers/auction_fp.pdf, 1998.

Auctioned or brokered sales are the norm in the business world for negotiating trades of large value. But consumer sales and small scale purchases typically stay with fixed prices, perhaps because of the high overhead cost of using the auction or brokerage method. The new economics of the Internet will make auctions popular in consumer and small business transactions as well. H. G. Lee and T. H. Clark in "Impact of the Electronic Marketplace on Transaction Cost and Market Structure", *International Journal of Electronic Commerce*, Vol. 1, No. 1, Fall 1996, at pages 127-149, present economic forces underlying this transition. Several success stories about Internet auctions are cited by Efraim Turban in "Auctions and Bidding on the Internet: An Assessment", *International Journal of Electronic Markets*, Vol. 7, No. 4.

Different Auction Methods

The commonly used auction types are the open-cry auctions, single and multiple round sealed bid auctions and descending-price auctions. In an open-cry auction, also called an "English auction", the buyers gather at a common location, physical or virtual, at the pre-specified time. Each buyer can hear the bid submitted by a rival buyer and has a limited time to respond to it with a higher counter-bid. In physical auctions, the responses must be received within seconds, while in Internet auctions it is conceivable that several minutes or hours will be allowed for the response. In a sealed bid auction the buyers are required to submit their bids by a specified deadline. The auctioneer keeps the bid information secret until the deadline, at which time the bids are evaluated and the winners are declared. Single round sealed bid auctions lack the competitive atmosphere (bidding frenzy) in open cry auctions which encourages the bidders to outbid their rivals. Multiple round sealed bid auctions rectify this situation. In a multiple round sealed bid auction, there is a deadline for each round of bids, and at that deadline either the auction is closed or the bids from the current round are publicized and a fresh round of bids is solicited by some new deadline.

Descending price auctions (also known as "Dutch auctions" in literature as described for example by M: Kumar and S. I. Feldman in "Business Negotiations on the Internet", *Proc. Inet '98*, Geneva, Switzerland, Jul. 21-23, 1998) are better suited for perishable items such as vegetables or airplane seats. Here the auctioneer starts with a very high asking price. Then he gradually decreases his asking price until buyers emerge with bids specifying how many items they will purchase at the current asking price. He can continue lowering his bid to maintain a stream of buyers while the inventory lasts. Furthermore, he can control how fast he depletes his inventory by controlling the rate at which he lowers the bid.

Each of these auction methods has subtle variations such as:

Anonymity, i.e., what information is revealed during the auction and after the auction closes. For example, the identity of the bidders could be concealed. In a sealed bid auction the final winning prices could be kept confidential. In all auctions the amount of inventory may or may not be announced in advance.

Rules for ending descending price and open cry auctions. Open-cry auctions may end at a posted closing time. Alternatively the auctions could be kept open so long as new bids continue to arrive within some time interval of the preceding bid. This interval would be several minutes in an Internet auction and a few seconds for an auction being conducted in a meeting room. One could also choose to close the auction if either of the above two conditions is met or only when both conditions are met. Descending price auctions could close at a pre-specified time, when all the inventory has been sold, when the price has fallen to a pre-specified level, or at some combination of these three conditions.

Once the bidding phase is over, the bidders with the highest bids get the item being auctioned, but the price they pay could be the same as what they bid or lower. In a Discriminative Auction, also known as "Yankee auction", the winners pay what they bid. In a non-discriminative auction people with winning bids pay the price paid by the winning bidder with lowest bid (this is currently the trend on the internet; sites like the Ebay site use this methodology for auctioning off multiple items and surprisingly this variation of auction is known as "Dutch auction" but is not a descending price auction). Finally, in an auction for a single item, in a "Vickrey auction", as described by David Vickrey in "Counter Speculation, Auctions, and Competitive Sealed Tenders", *The Journal of Finance*, March 1961, at pages 9-37, the winner pays the price bid by the second highest bidder. "Vickrey auctions" are also referred to as second price sealed bid auctions.

Restrictions on bid amount: In all auctions the seller can specify the minimum starting bid. To speed up the bidding process minimum bid increments are often enforced. The bid increment is roughly proportional to the current bid, i.e., they are smaller for lower bids and larger at higher bids. In the open cry auctions for multiple items (i.e., "Dutch auction") on sites like the Ebay site, there is no minimum increment. The only thing that is expected from the bidder when he bids is that the bid value should be greater than or equal to the minimum starting bid value. The seller may also be allowed to specify a reserve price, which is a lower limit on price acceptable to seller. The buyers may know that a reserve price exists but they may not know what the reserve price is.

SUMMARY OF THE INVENTION

According to this invention, we focus on open-cry and descending price auctions (including the variations as described above) of single or multiple copies of indivisible goods. We provide methods wherein bids for an auction can be processed and some bids filtered out in a decentralized manner using multiple nodes (processors). Each node could be a shared-memory multiprocessor, or a distributed memory multiprocessor. These nodes could sit in a room or could be placed geographically far apart.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
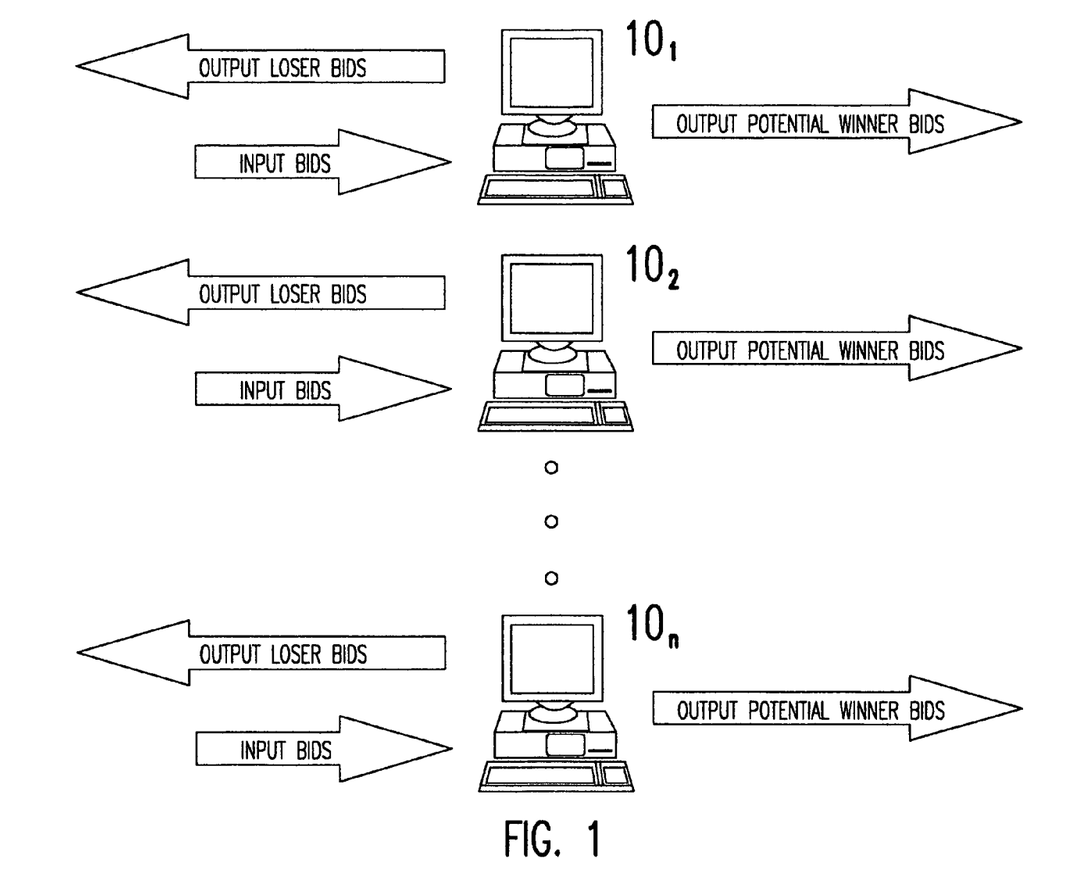
FIG. 1 is an illustration of the decentralized model for processing bids of an open-cry or descending price auction for multiple items according to the invention.

Referring now to the drawings, and more particularly to FIG. 1, there is shown the general model for processing bids of an open-cry and descending price auction. Each computer $10_1, 10_2, \ldots, 10_n$ represents a server or node in a distributed computing system. The input to each computer is a set of bids of a given auction and the output is the set of loser bids (those bids which can never be part of the winning set) and also those which are potential winners.

Each node could get the bids input to it from a database, or from another node, or from over the Internet (i.e., directly from the client/bidder who has sent the bid). A bidder could place a new bid or could place a modification of a bid placed by him in the past (see "Internet Auctions" by Kumar and Feldman, supra).

Open-Cry Auctions

In the current state of the art of auction procedure, every time any node (i.e., server) processes a set of bids, it determines the global winners; i.e., it determines the winning bids amongst all the bids received thus far. These winning bids are selected based on pre-specified rules. We call this the Current Global Winner (CGW) determination method and discuss it below.

Our invention is to introduce two Current Local Winner (CLW) determination methods, also described below. Each CLW method determines a set of potential winners from observing a set of bids, and rejects the remaining bids as loser bids. A potential winner from a CLW determination method may again be processed by a CLW determination method or finally by a CGW determination method. The purpose of the CLW determination method is to filter out loser bids quickly so that improved response times are achieved and the global method (i.e., the CGW) is not impeded by heavy traffic. Two algorithms of the CLW determination method are given below.

Figure 2:
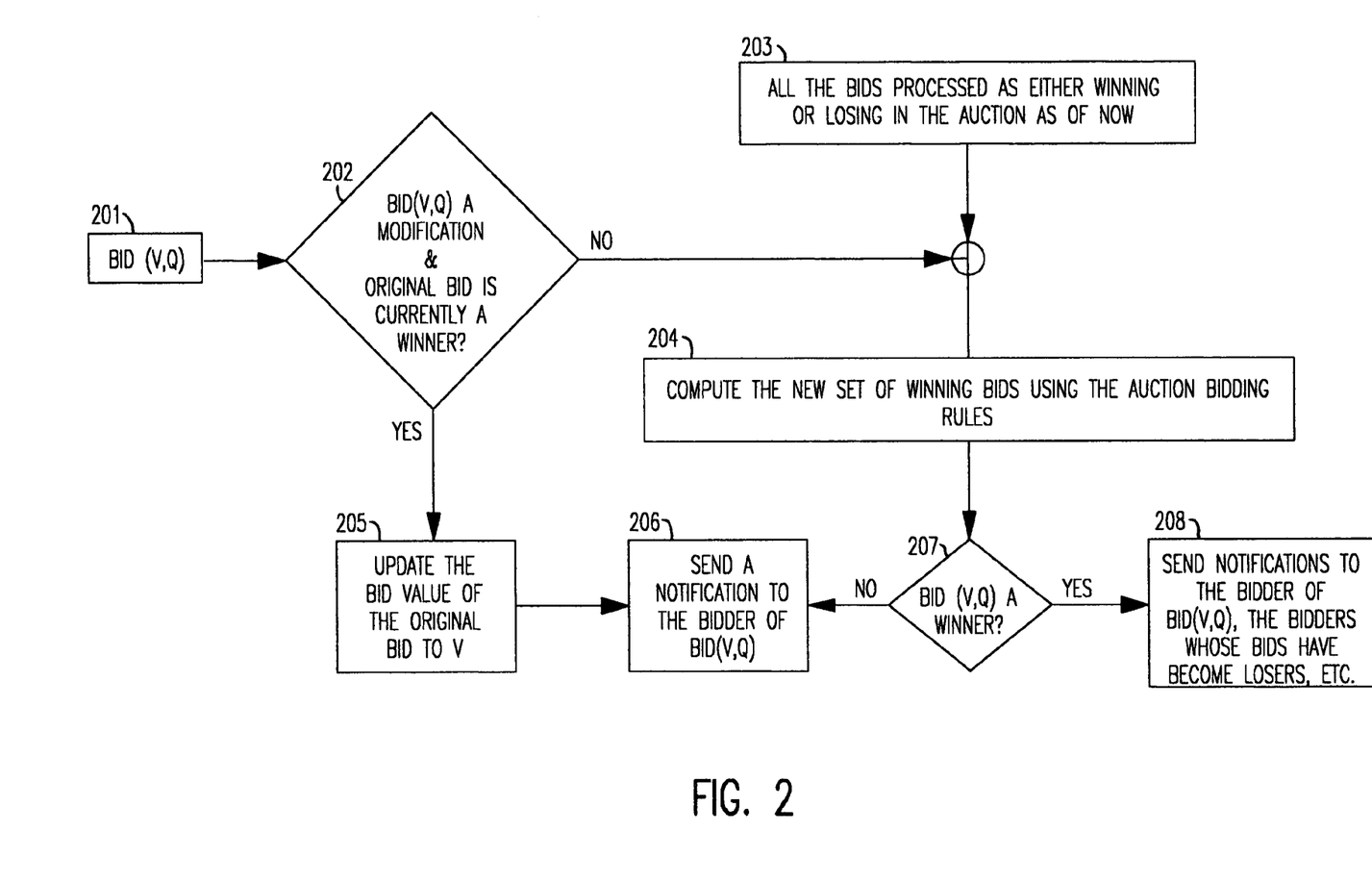
FIG. 2 is a flow diagram of the Current Global Winner (CGW) determination method.

The Current Global Winner (CGW) determination process is shown in FIG. 2. The CGW determination method considers bids (that have not been declared losers) and, using pre-specified auction bidding rules, decides the set of current winner bids for auctioning N copies of a single item. A new bid(v,q) input at 201 is examined in decision block 202 to determine if the new bid is a modification and the original bid is currently a winner. If not, then to decide whether a bid is a winner or a loser, the process takes this bid along with the set of all bids that have been processed 203 (declared either winning or losing in the auction in the past) and determines a new set of winners in function block 204 (using the auction bidding rules, defined below). Note that if the bid under consideration were a modification of a bid (let us call it the parent bid) submitted by the bidder in the past and the parent bid is currently a winning bid as determined in decision block 202, then the processing simply involves updating the bid value of the parent bid to the bid value v of the bid under consideration in function block 205. Notification is sent to the bidder of bid(v,q) in function block 206. After the new set of winners is computed in function block 204, a determination is made in decision block 207 as to whether bid(v,q) is a winner or a loser. If a loser, then notification is sent to the bidder of bid(v,q) in function block 206. If a winner, a message is sent to the bidder apprizing him of this status in function block 208.

An example of auction bidding rules for multiple items are:

1. When there are two bids at different prices, the higher value bid always wins.
2. When there are bids at the same price but different in quantities, the higher quantity bid wins.
3. When there are bids at the same price and equal in quantities, the bidder who placed his/her first bid earlier wins. Bidders may rebid after being outbid and the server will retain their initial bid time.

Another example of open-cry auction bidding rules are:

1. A bid is processed to be winner if the bid value (per item) of the bid is greater than or equal to the current highest bid plus the increment.
2. If two or more bids arrive at the auction and both have the same bid value then the tie will be broken based upon the time of arrival. The bid to arrive first will be considered first, and so on.
3. At the end of the auction the items will be allocated to the bids in the decreasing order of the bid value (per item). That is the bid with the highest bid value is considered first and then the next highest bid, and so on.

Further examples of such bidding rules may be found at the Yahoo site, the Ebay site, etc.

Figure 3:
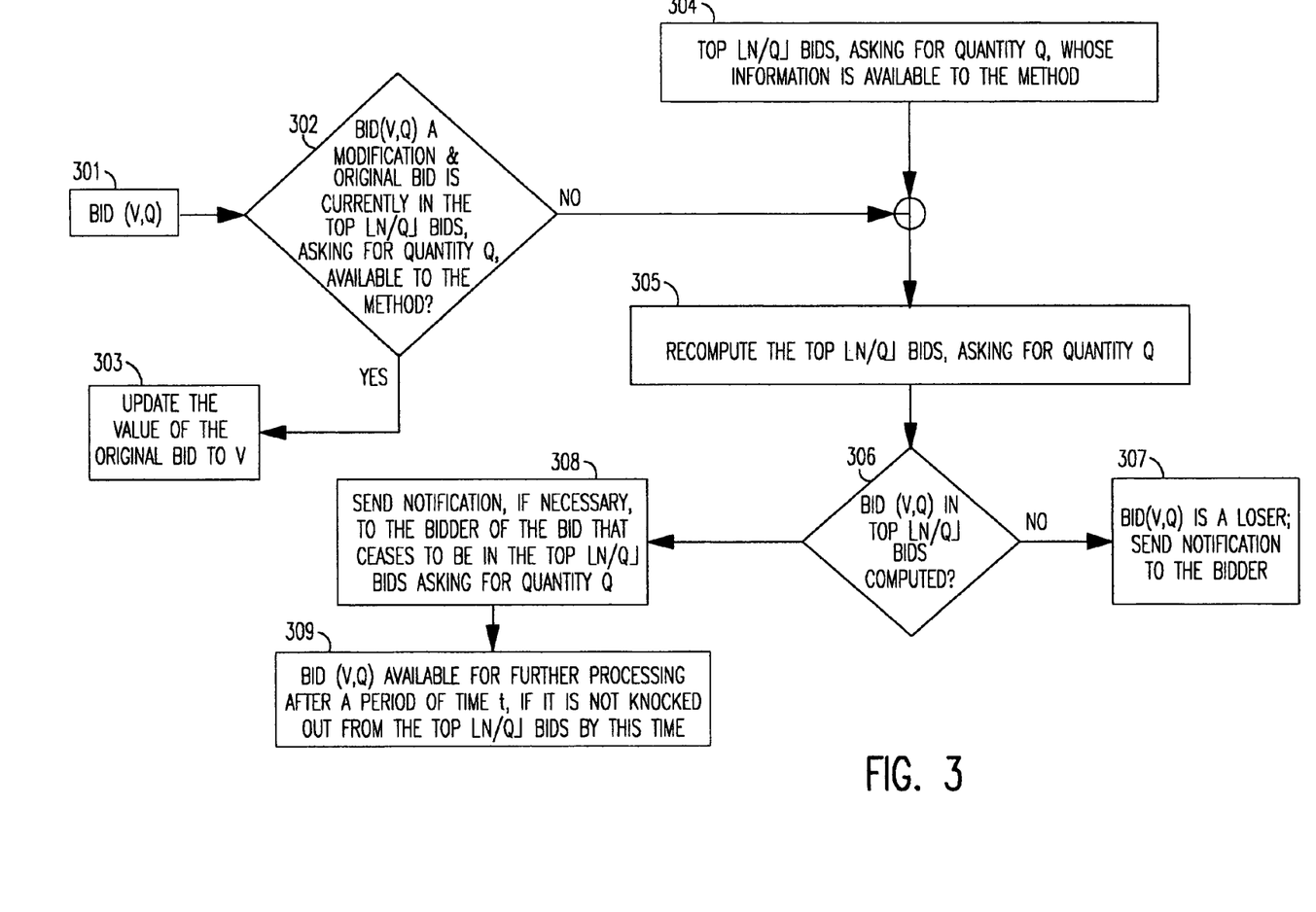
FIG. 3 is a flow diagram of the processing of bid(v,q) in a first Current Local Winner (CLW1) determination method according to the invention.

In the Current Local Winner determination process 1 (CLW1) shown in FIG. 3, a new bid(v,q) is input at 301 and in decision block 302, a Segregation Filter is used. This filter process considers a bid (v,q), where v denotes the price per unit and q denotes the quantity desired. It checks to see if this bid ranks in the top $\lfloor N/q \rfloor$ bids (in terms of price/unit bid value) amongst all the bids asking for quantity q whose information is available to this process, $\lfloor x \rfloor$ stands for the greatest integer less than or equal to x. Also recall that N denotes the number of copies of a single item on sale. In decision block 302, a determination is made as to whether the new bid is a modification and the original bid is in the top $\lfloor N/q \rfloor$ bids asking for quantity q. If so, the value v of the original bid is updated in function block 303. If not, then to decide whether a bid is a winner or a loser, the process takes this bid along with the set of $\lfloor N/q \rfloor$ bids that have been processed 304 and determines a new set of top $\lfloor N/q \rfloor$ bids in function block 305. A determination is then made in decision block 306 to determine if bid(v,q) is in the top $\lfloor N/q \rfloor$ bids. If it is not, it is deemed a loser bid, as it can never be a winning bid, and notification is sent to the bidder in function block 307. If it is in the top $\lfloor N/q \rfloor$ bids, it is declared a candidate bid and a check is made to see if another bid has dropped from the list of top $\lfloor N/q \rfloor$ bids and, if so, then that bid is considered a loser bid and notification is sent to that bidder in function block 308. The candidate bid is held for time, $\tau$, in function block 309. If by time $\tau$, through an arrival of another bid, a candidate bid loses its position amongst the top $\lfloor N/q \rfloor$ highest bids, it is considered a loser bid. Otherwise it is considered a winner candidate from this process and is made accessible for further processing.

This time $\tau$ need not be a constant. It may be set to be a decreasing function of the bids position amongst top $\lfloor N/q \rfloor$ highest bids. The higher the position, the less the wait before the bid is moved to the next level of processing. The lower the position, the higher the wait and hence the higher the possibility that the incoming bids may knock this bid from the candidate winners list. Also, in case of available capacity or other reasons (e.g., priority given to a bidder), a candidate bid may be used by another process even before time $\tau$ has expired. Note that in case the bid (v,q) were a modification of a bid submitted by the bidder in the past and the original bid happens to lie in the top $\lfloor N/q \rfloor$ bids (asking for quantity q), then the processing simply amounts to updating the bid value of the original bid to v.

Figure 4:
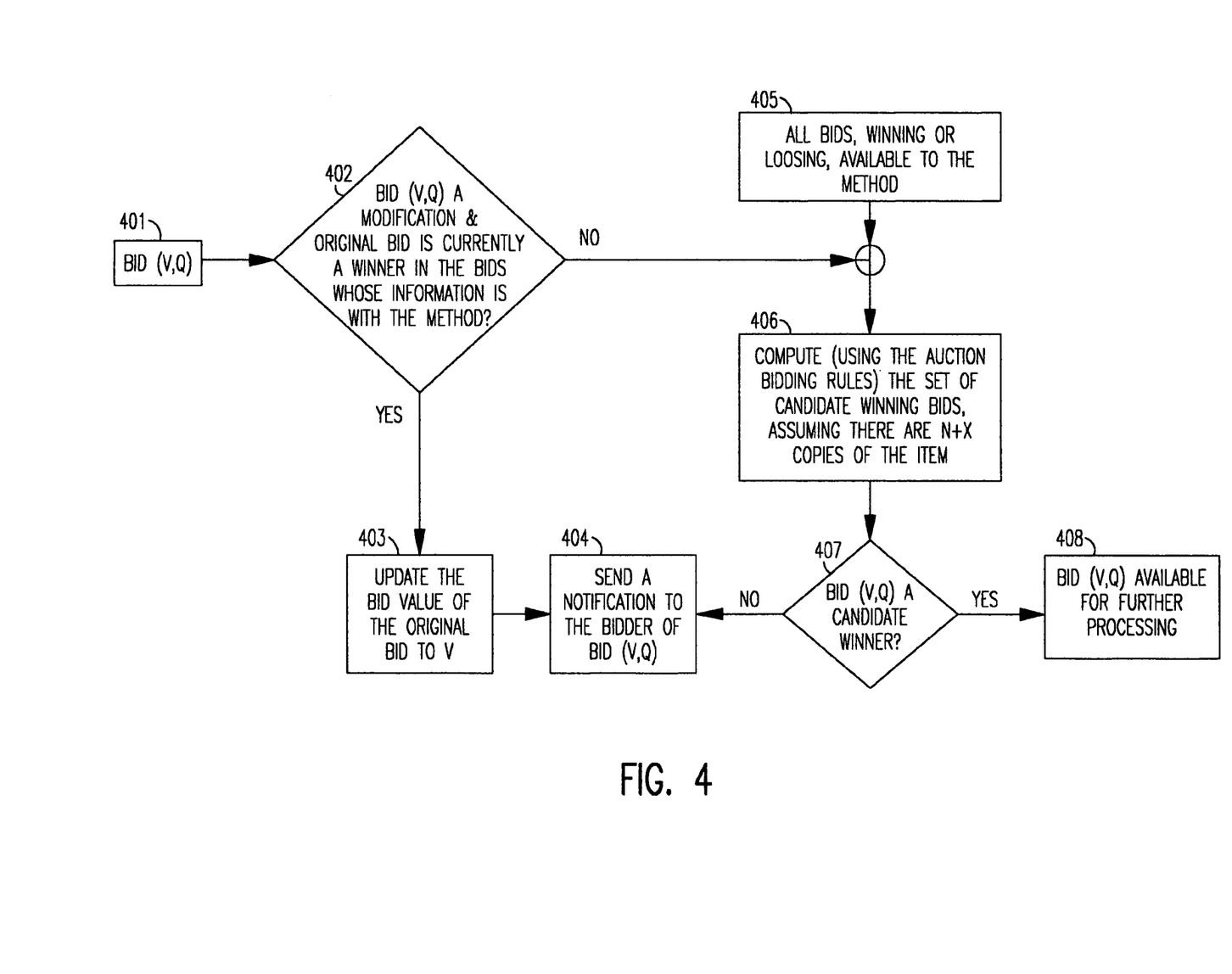
FIG. 4 is a flow diagram of the processing of bid(v,q) in a second Current Local Winner (CLW2) determination method according to the invention.

In the Current Local Winner Determination process 2 (CLW2) shown in FIG. 4, a new bid(v,q) is input at 401 and in decision block 402, a determination is made as to whether the new bid is a modification and the original bid is currently a winner. As in the previous methods, if the bid under consideration is a modification and the original bid is currently a winning bid amongst the bids, whose information is available to this method, then the processing simply amounts to updating the bid value v in function block 403, and notification is sent to the bidder in function block 404. This process uses a Buffer Filter. This filter process considers a set of bids 405, whose information is available to this process, unsegregated by quantity and uses a set of pre-specified auction rules identical to the CGW determination method in every respect except that it selects winners for auctioning N+x copies of the item (recall that the CGW method considered N copies) on sale in function block 406. A determination is made in decision block 407 as to whether the bid(v,q) is a winner. These winner bids are called candidate winner bids and can be processed using other methods in function block 408. The losers are referred to as loser bids, and notification is sent to the bidders in function block 404.

The buffer x is decided based on trade-off between the degree of filtration needed and the accuracy of the process. The smaller x, the more the bids rejected and hence higher the degree of filtration. On the other hand, for small x it is possible (though unlikely) that we may reject bids that would have been part of the winner set if only CGW process was used and CLW was never used.

Algorithm for Processing a Bid

Figure 5:
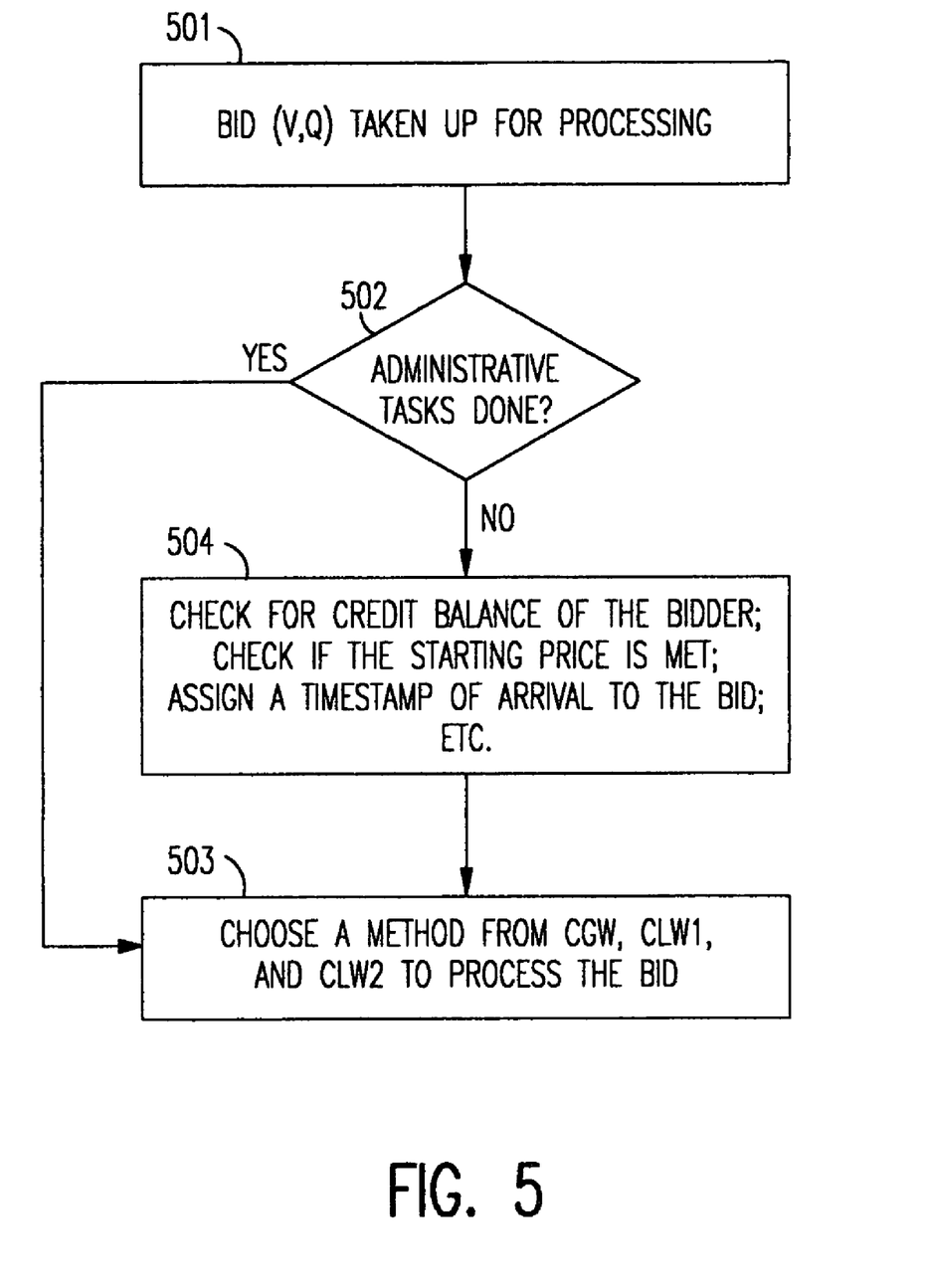
FIG. 5 is a flow diagram of the main algorithm used to process bid(v,q) at a node.

We now describe the main algorithm that a node executes to process a bid input to it. The process is shown in FIG. 5. A node takes a bid (v,q) for processing at input block 501. A determination is first made in decision block 502 as to whether administrative tasks have been completed. If so, it chooses one method out of the methods CGW, CLW1, and CLW2 to process the bid in function block 503. The choice of the method could be based on the priority assigned to the bid, the incoming traffic to the auction, etc. The bid is processed using the chosen method. If the administrative tasks have not been completed, as determined in decision block 502, the node also has to perform other tasks in function block 504 before it can decide whether a bid is a loser or a winner. These tasks are:
 1. checking for the credit balance of the bidder (if needed in the auction),
 2. whether the bid is above the starting price,
 3. assigning a time stamp of arrival to the bid, and
 4. assigning the bid to the database (the database could be global or it could be distributed), etc.

Note that all these tasks can be accomplished by dedicated nodes. Although we have considered ascending price open cry auctions, the same ideas hold true when it is a descending price (also known as "reverse") open cry auction. In a descending price open cry auction, the bid increment is negative and winners are determined from amongst the lowest bids received as opposed to the highest bids in an ascending price open cry auction.

Descending Price Auction

As we described above, the distinguishing feature of a descending price auction is that the supplier (or auctioneer) decrements the asking price (per unit). The amount by which the price is decremented could be different for different decrement epochs in time. Upon a price decrement, it may happen that a large number of buyers bid simultaneously (because the asking price is within their reach). This may over load the auction server. We first present the method that is currently used for processing bids of a descending price auction. We next present a method, which also is part of our invention, that can filter out loser bids and thus help in reducing the load and improve response time to the buyers. Both these methods work together to reduce the processing load. Let R be the remaining number of copies of the item on auction (note that R=N at the start of the auction).

CGW 2: Descending Price Global Algorithm

Figure 6:
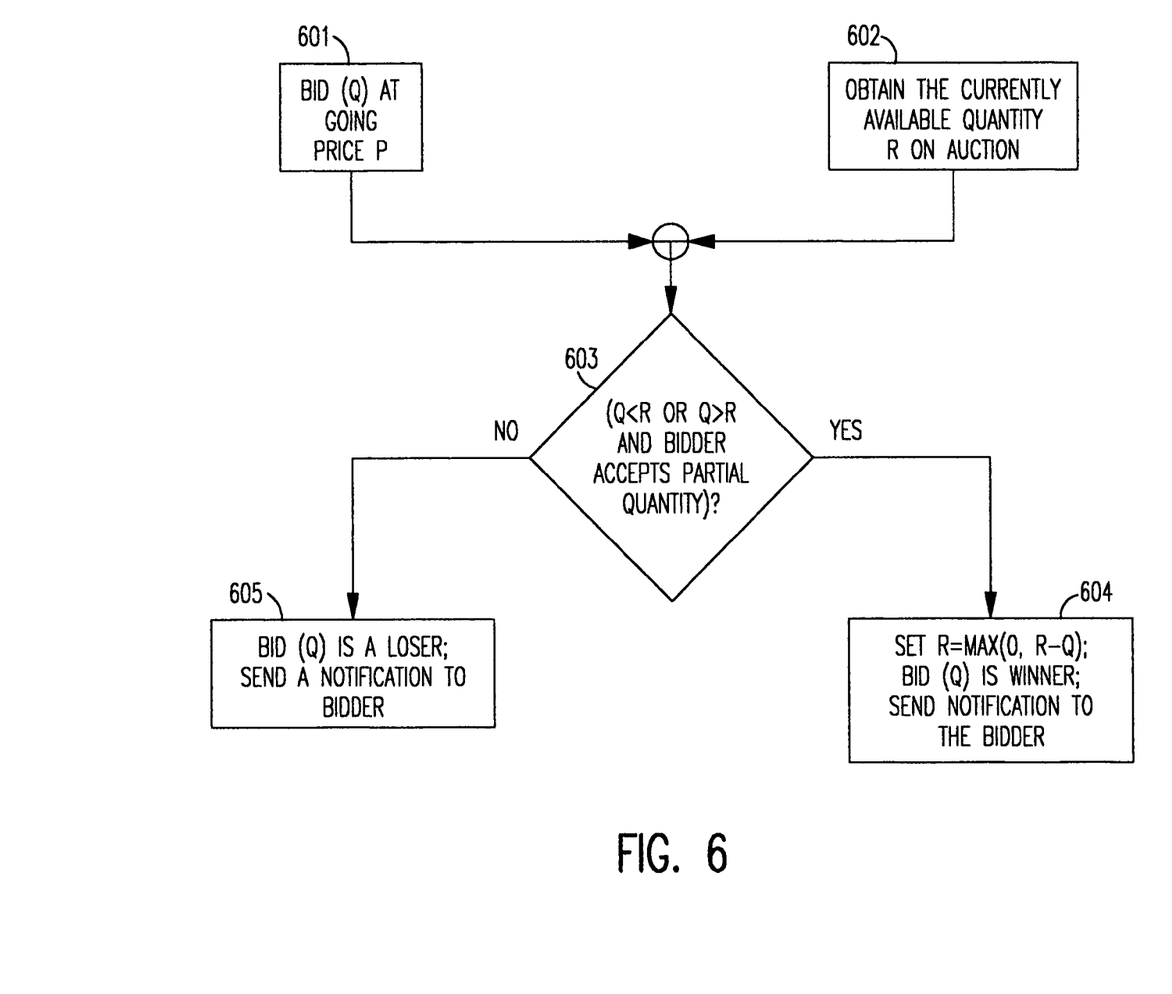
FIG. 6 is a flow diagram of the CGW2 method used to process a bid(v,q) in a descending price auction at a node.

This algorithm is shown in FIG. 6. Take a bid (q) for processing, where q is the quantity desired at going price p, input at 601. The currently remaining quantity R on auction are obtained at 602. While the node, that is running this method, reads the available quantity on auction, no other process on any node can modify this value (for example, if the value R lies in a database, like IBM's DB2, then it amounts to reading R by obtaining a lock on it in the "share" or "exclusive" mode). A determination is made in decision block 603 as to whether $q \leq R$ or $q > R$ and the bidder is ready to accept a partial quantity. If $q \leq R$ or $q > R$ but the bidder is ready to accept partial quantity, then the method modifies the value of R to max $(0, R-q)$ in function block 604. Also the method may send a notification to the bidder that his bid is accepted, etc. On the other hand if $q > R$ and the bidder is not ready to accept partial quantity, then a notification may be sent apprising him of this situation in function block 605.

CLW 3: Descending Price Filter

Figure 7:
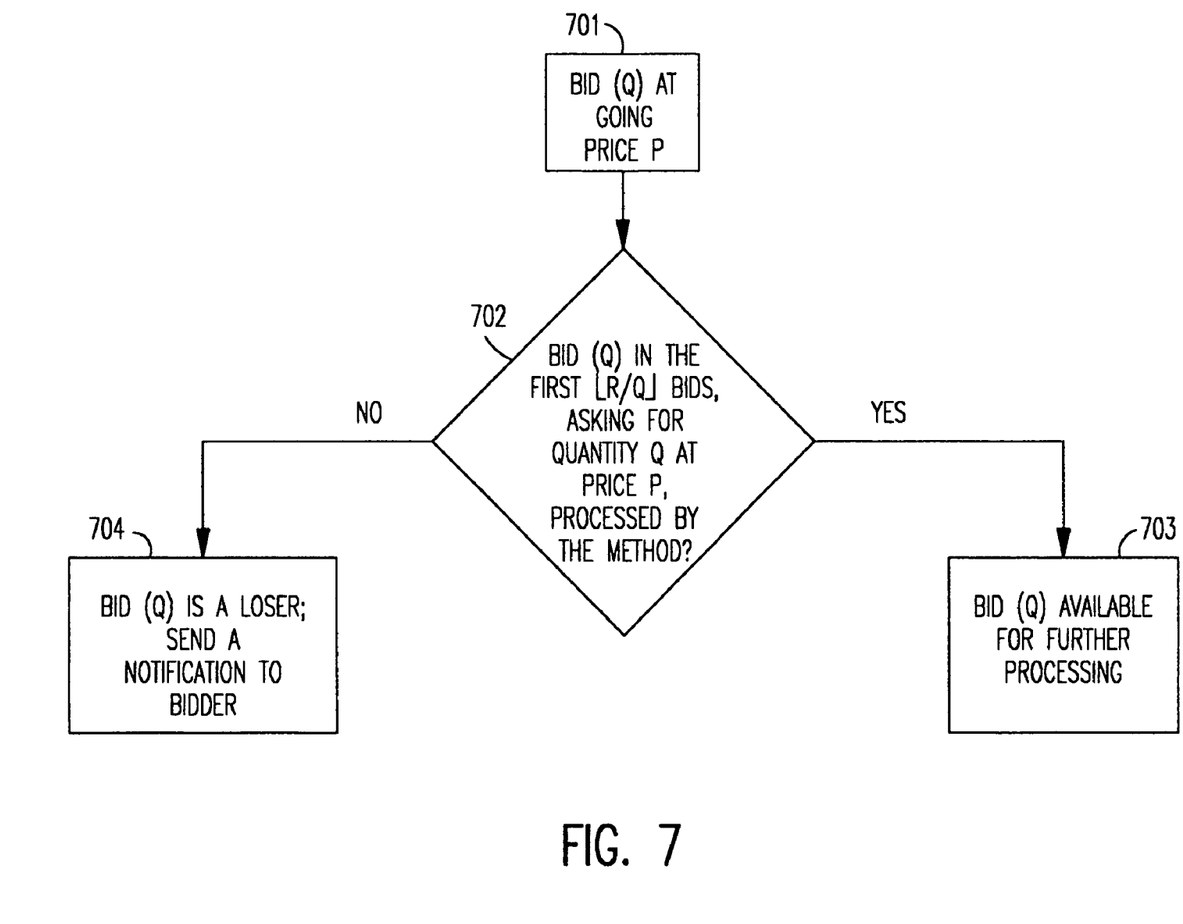
FIG. 7 is a flow diagram of the CLW3 method used to process a bid(v,q) in a descending price auction at a node.

This process is shown in FIG. 7. Take a bid (q) for processing, where q is the quantity desired at going price p, at input 701. A determination is made in decision block 702 as to whether the bid is in the first $\lfloor R/q \rfloor$ bids, asking for quantity q at price p. If the bid is in the first $\lfloor R/q \rfloor$ bids (asking for quantity q at the going price p) processed by the method, then the bid is a candidate winner bid; otherwise, it is a loser. A candidate winner bid is available for further processing at function block 703. In the case of a loser bid, notification is sent to the bidder at function block 704. Each bid that is processed by the method either carries a time stamp of arrival or is given at the node while processing. It is assumed that if the time stamp already exists on the bid, then it must be greater than or equal to the time stamp of any bid (asking for quantity q at going price p) that has been processed by the method in the past.

The main algorithm executed at each node is same as in the open-cry auction case, except that instead of CGW, CLW1, and CLW2 methods we now have CGW2 and CLW3 methods which can be chosen by a node to process a bid.

While the invention has been described in terms of preferred embodiments, those skilled in the art will recognize that the invention can be practiced with modification within the spirit and scope of the appended claims.

The invention claimed is:

1. A distributed method for processing descending auction traffic using one or more servers at a plurality of nodes in a distributed processing system comprising the steps of:

using a current local winner determination method at each of the nodes to identify loser bids and candidate winning bids, wherein the current local winner determination method comprises the steps of:

(a) receiving a bid (q) for processing, where q is the quantity desired at going price p;

(b) determinating whether the bid is in the first $\lfloor R/q \rfloor$ bids, asking for quantity q at price p, where $\lfloor x \rfloor$ stands for the greatest integer less than or equal to x and R is a currently remaining quantity on auction;

(c) if the bid is in the first $\lfloor R/q \rfloor$ bids, asking for quantity q at the going price p, then declaring the bid a candidate winner bid; and (d) making the candidate winner bid available for further processing by the current global winner determination method; and using a current global winner determination method to determine from the candidate winning bids from each of the nodes a current set of winners.

2. The method of claim 1, further comprising the steps of:

giving bids processed by the method a time stamp of arrival; and determining whether the time stamp, if it exists on the bid, is greater than or equal to the time stamp of any bid, asking for quantity q at going price p, that has been processed by the method in the past.

3. The method of claim 1, wherein bidders submit multi-item bids and the bids may be indivisible.

* * * * *